(12) United States Patent
Waller et al.

(10) Patent No.: US 10,412,589 B2
(45) Date of Patent: Sep. 10, 2019

(54) BROADCAST APPARATUS AND METHOD OF AUTHENTICATING BROADCAST DATA

(71) Applicant: SAMSUNG ELECTRONICS CO., LTD., Suwon-si (KR)

(72) Inventors: Arthur Simon Waller, Middlesex (GB); Jan Outters, Middlesex (GB); John Adam, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 15/004,054

(22) Filed: Jan. 22, 2016

(65) Prior Publication Data
US 2016/0227406 A1 Aug. 4, 2016

(30) Foreign Application Priority Data

Feb. 3, 2015 (GB) .................................. 1501786.6
Sep. 23, 2015 (KR) ........................ 10-2015-0134820

(51) Int. Cl.
G06F 21/51 (2013.01)
G06F 21/57 (2013.01)
(Continued)

(52) U.S. Cl.
CPC ............ H04W 12/10 (2013.01); G06F 21/51 (2013.01); G06F 21/57 (2013.01); G06F 21/64 (2013.01); H04L 63/123 (2013.01); H04N 21/2362 (2013.01); H04N 21/23892 (2013.01); H04N 21/435 (2013.01); H04N 21/4345 (2013.01); H04N 21/4433 (2013.01);
(Continued)

(58) Field of Classification Search
CPC .......... G06F 21/51; G06F 21/57; G06F 21/64; H04L 4/06; H04L 63/10; H04L 63/123; H04L 67/16; H04W 12/10
See application file for complete search history.

(56) References Cited

U.S. PATENT DOCUMENTS 6,502,137 B1 * 12/2002 Peterson ............. H04L 63/0428
705/51
8,397,078 B2 3/2013 Kusudo et al.
(Continued)

FOREIGN PATENT DOCUMENTS

EP 2 252 055 A1 11/2010
GB 2484893 A 5/2012
(Continued)

OTHER PUBLICATIONS

Communication dated May 11, 2017 issued by the European Patent Office in counterpart European Patent Application No. 16746764.6.
(Continued)

Primary Examiner — Joseph P Hirl
Assistant Examiner — Kalish K Bell
(74) Attorney, Agent, or Firm — Sughrue Mion, PLLC

(57) ABSTRACT

A broadcast receiver includes a communicator configured to receive broadcast data including metadata associated with an application and a controller configured to obtain a comparison result by comparing a reference hash with a metadata hash generated based on the metadata, authenticate the metadata based on the comparison result, and launch the application based on a result of the authentication.

17 Claims, 13 Drawing Sheets

(51) Int. Cl.
*G06F 21/64* (2013.01)
*H04W 12/10* (2009.01)
*H04N 21/434* (2011.01)
*H04N 21/435* (2011.01)
*H04N 21/462* (2011.01)
*H04N 21/81* (2011.01)
*H04L 29/06* (2006.01)
*H04N 21/2362* (2011.01)
*H04N 21/2389* (2011.01)
*H04N 21/442* (2011.01)
*H04N 21/443* (2011.01)
*H04N 21/835* (2011.01)
*H04W 4/06* (2009.01)

(52) U.S. Cl.
CPC ... *H04N 21/44236* (2013.01); *H04N 21/4622* (2013.01); *H04N 21/8173* (2013.01); *H04N 21/835* (2013.01); H04L 63/1441 (2013.01); H04W 4/06 (2013.01)

(56) References Cited

U.S. PATENT DOCUMENTS

| | | | |
|---|---|---|---|
| 9,419,664 B2 | 8/2016 | Wang | |
| 2003/0187961 A1* | 10/2003 | Kamata | G06F 3/1253 709/219 |
| 2007/0101146 A1* | 5/2007 | Louch | H04L 63/10 713/176 |
| 2007/0201699 A1 | 8/2007 | Kasuya | |
| 2007/0223392 A1 | 9/2007 | Kim et al. | |
| 2007/0234422 A1 | 10/2007 | Piesing | |
| 2009/0172784 A1 | 7/2009 | Park et al. | |
| 2009/0228923 A1 | 9/2009 | Lee et al. | |
| 2010/0082672 A1* | 4/2010 | Kottomtharayil | G06F 11/1451 707/770 |
| 2013/0055335 A1* | 2/2013 | Chien | G06F 21/572 726/1 |
| 2013/0159971 A1* | 6/2013 | Gieselmann | G06F 8/30 717/120 |
| 2014/0310759 A1* | 10/2014 | Yamagishi | H04N 21/278 725/110 |
| 2014/0331250 A1 | 11/2014 | Kitahara et al. | |

FOREIGN PATENT DOCUMENTS

| | | |
|---|---|---|
| KR | 10-2004-0072834 A | 8/2004 |
| WO | 2005/117443 A2 | 12/2005 |
| WO | 2006/086538 A2 | 8/2006 |

OTHER PUBLICATIONS

Communication dated Jul. 22, 2015, issued by the Intellectual Property Office of the United Kingdom in counterpart British Patent Application No. GB1501786.6.

Search Report dated May 13, 2016, issued by the International Searching Authority in counterpart International Application No. PCT/KR2016/000487 (PCT/ISA/210).

Written Opinion dated May 13, 2016, issued by the International Searching Authority in counterpart International Application No. PCT/KR2016/000487 (PCT/ISA/237).

Communication dated Jul. 25, 2018, issued by the European Patent Office in counterpart European Application No. 16 746 764.6.

Guillaume Plouin et al. "XML Trust: Technology and Implementation", Sep. 2002, Retrieved from the Internet: http://www.techmetrix.com.com/trendmarkers/wp/downloadwp.php?code=wpp0902-1, XP002298374, 20 pages total.

Communication dated Feb. 11, 2019, issued by the European Patent Office in counterpart European Application No. 16746764.6.

Martyn Lee, "TM-T0021 r1_Smart-TV-risk.docx", DVB, Digital Video Broadcasting, C/O EBU—17A Ancienne Route—CH-1218 Grand Saconnex, Jan. 7, 2015 (3 pages total).

* cited by examiner

BROADCAST APPARATUS AND METHOD OF AUTHENTICATING BROADCAST DATA

CROSS-REFERENCE TO RELATED APPLICATIONS

This application claims priority from United Kingdom Patent Application No. 1501786.6, filed on Feb. 3, 2015 in the United Kingdom Intellectual Property Office, and Korean Patent Application No. 10-2015-0134820, filed on Sep. 23, 2015 in the Korean Intellectual Property Office, the disclosures of which are incorporated herein in their entireties by reference.

BACKGROUND

1. Field

Apparatuses and methods consistent with exemplary embodiments relate a broadcast apparatus for performing authentication and an authentication method, and more particularly, to a broadcast apparatus and an authentication method, in which a broadcast receiver or a server performs authentication, thereby safely launching an application providing a broadcast service.

2. Description of the Related Art

The use of broadcast systems, where broadcast is merged with the Internet, such as Hybrid broadcast broadband (Hbb) TV (ETSI TS 102 796) or Multimedia Home Platform (MHP) (ETSI TS 102 812), is expanding. As broadcast systems become increasingly popular, security is becoming an increasingly important issue in an operation of transmitting broadcast data. In detail, when broadcast data is transmitted from a broadcast provider to a broadcast receiver over a network, the broadcast data is greatly exposed to an attack, such as a man-in-the-middle attack and/or the like. An attacker replaces broadcast data with its own data and transmits changed broadcast data.

Therefore, there is needed a technology where a broadcast receiver authenticates received broadcast data, and only authorized broadcast data is used.

SUMMARY

One or more exemplary embodiments provide a method whereby metadata associated with an application is authenticated by using a hash, and a broadcast receiver safely launches the application that is secure against a man-in-the-middle attack.

According to an aspect of an exemplary embodiment, there is provided a broadcast receiver including: a communicator configured to receive broadcast data including metadata associated with an application; and a controller configured to obtain a comparison result by comparing a reference hash with a metadata hash generated based on the metadata, authenticate the metadata based on the comparison result, and launch the application based on a result of the authentication.

The broadcast receiver may further include a display configured to display information corresponding to the launched application.

The controller may be further configured to generate the metadata hash and may compare the generated metadata hash with the reference hash.

The broadcast receiver may further include a storage configured to store a plurality of reference hashes for a same application, and the controller may be further configured to select one reference hash from among the stored plurality of reference hashes and compare the selected reference hash with the metadata hash.

The broadcast receiver may further include a storage configured to store a plurality of reference hashes for a same application and authentication information indicating valid periods for a plurality of the reference hashes, and the controller may be further configured to select a reference hash from among the plurality of reference hashes having a valid period at a time when the metadata is received based on the authentication information.

The communicator may be further configured to transmit a request for the reference hash to a server and receive the reference hash from the server, and the request for the reference hash may include service identification information for identifying a service corresponding to the application which is received along with the metadata.

The communicator may be further configured to receive a plurality of reference hashes from the server in response to the request, and the controller may be further configured to authenticate the metadata by comparing the received plurality of reference hashes with the metadata hash to determine whether one reference hash of the received plurality of reference hashes matches the metadata hash.

The communicator may be further configured to transmit an authentication request for the received metadata to a server, and the communicator may be further configured to receive from the server, in response to the authentication request, a comparison result obtained by comparing the metadata hash with the reference hash.

The authentication request may include the metadata and service identification information for identifying a service corresponding to the application.

The controller may be further configured to generate the metadata hash, and the communicator may be further configured to transmit, to the server, service identification information for identifying a service corresponding to the application and an authentication request including the generated metadata hash.

The communicator may be further configured to receive, in response to the authentication request, the comparison result.

The service identification information may include at least one of an original network identifier (ON-ID), a transport stream identifier (TS-ID), a service identifier (S-ID), a country identifier (ID) for identifying a country at which the broadcast receiver is located, and a broadcast medium ID for identifying a broadcast medium through which the broadcast data received by the broadcast receiver passes.

The broadcast receiver may further include a display, and the controller may be further configured to, in response to the authentication of the metadata failing, control the display to display a warning message indicating that the metadata is not authenticated.

The broadcast receiver may further include a user input, e.g., a user input device, configured to receive a user input for forcibly executing the application when the authentication of the metadata fails, and the controller forcibly may be further configured to execute the application, based on the user input.

According to an aspect of another exemplary embodiment, there is provided a server for authenticating metadata associated with an application including: a storage configured to store a reference hash; a communicator configured to receive an authentication request from a broadcast receiver; and a controller configured to obtain a metadata hash of the metadata based on the authentication request, search for a reference hash corresponding to the authentication request in the storage, compare the obtained metadata hash with the reference hash, and control the communicator to transmit a result of the comparison to the broadcast receiver.

The authentication request may include service identification information for identifying a service corresponding to the metadata, and the controller may be further configured to search for the reference hash corresponding to the identified service in the storage.

The authentication request may include the metadata, and the controller may be further configured to generate the metadata hash from the metadata.

The authentication request may include the metadata hash, and the controller may be further configured to extract the metadata hash from the authentication request.

The controller may be further configured to search for a plurality of reference hashes in the storage, compare the metadata hash with the plurality of reference hashes to determine whether the metadata hash matches one of the plurality of reference hashes, and control the communicator to transmit a result of the comparison to the broadcast receiver.

According to an aspect of another exemplary embodiment, there is provided a broadcast provider including: a controller configured to obtain metadata associated with an application, generate a reference hash of the metadata, and insert the metadata into broadcast data; and a communicator configured to transmit the broadcast data including the metadata to a broadcast receiver, wherein the controller is further configured to controls the communicator to transmit the reference hash to an external device so that the reference hash is used to authenticate the metadata.

According to an aspect of another exemplary embodiment, there is provided a metadata authentication method including: receiving broadcast data including metadata associated with an application; obtaining a comparison result by comparing a reference hash with a metadata hash generated based on the metadata; and authenticating the metadata, based on the comparison result.

According to an aspect of another exemplary embodiment, there is provided a broadcast receiver including: a transceiver configured to receive broadcast data including metadata corresponding to an application; a memory storing computer program code; and a processor configured to access the memory and execute to computer program code to extract the metadata, authenticate the metadata in response to a reference hash matching a metadata hash generated using the metadata, and launch the application in response to authenticating the metadata.

The processor may be further configured to access the memory and execute to computer program code to launch the application by installing the application and executing the installed application.

The broadcast receiver may further include a display.

The processor may be further configured to access the memory and execute to computer program code to, in response to the authentication of the metadata failing, control the display to display a warning message indicating that the metadata is not authenticated.

The warning message may indicate a request for user instruction whether to launch the application.

The processor may be further configured to access the memory and execute to computer program code to forcibly execute the application based on the user instruction.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
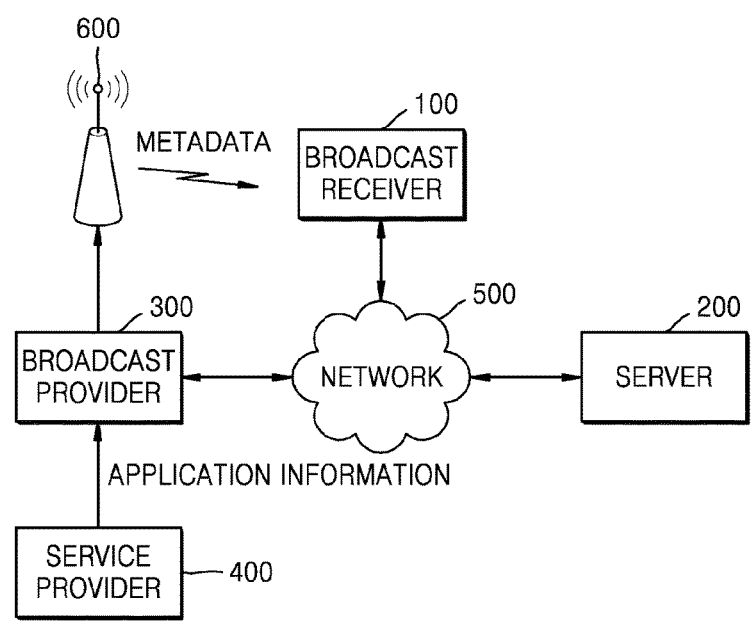
FIG. 1 is a diagram illustrating a broadcast system according to an exemplary embodiment.

Reference will now be made in detail to one or more exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. One or more exemplary embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Terms used herein have been selected as general terms which are widely used at present, in consideration of the functions of one or more exemplary embodiments, but may be altered according to the intent of an operator of ordinary skill in the art, conventional practice, or introduction of new technology. Also, a meaning of any arbitrarily selected term in a specific case will be described in detail in a corresponding description portion. The terms should be defined on the basis of the entire content of this specification instead of a simple understanding of each term used in isolation.

In this disclosure below, when it is described that something comprises (or includes or has) some elements, it should be understood that it may comprise (or include or has) only those elements, or it may comprise (or include or have) additional elements if not explicitly limited. Moreover, each of terms such as "unit", "apparatus," and "module" used herein denotes an element for performing at least one function or operation, and may be implemented in hardware, software or the combination of hardware and software.

Hereinafter, one or more exemplary embodiments will be described in detail so as to be easily understood by those of ordinary skill in the art with reference to the accompanying drawings. One or more exemplary embodiments may be embodied in many different forms and should not be construed as being limited to the one or more exemplary embodiments set forth herein. Certain well-known elements may be omitted for clarity.

FIG. 1 is a diagram illustrating a broadcast system according to an exemplary embodiment.

Referring to FIG. 1, the broadcast system may include a broadcast receiver 100 such as a television (TV) or a set-top box, a server 200, and a broadcast provider 300.

The broadcast provider 300 may transmit broadcast data to the broadcast receiver 100 through a transmitter. Here, the broadcast data may include data associated with broadcast streaming, metadata, and/or the like, but is not limited thereto.

The metadata may include various pieces of information associated with an application providing a broadcast service. For example, metadata associated with a certain application may include application identification information for identifying an application, service identification information for identifying a service corresponding to an application, authorization server identification information for identifying one or more authorized servers which are authorized for an application to perform communication, and/or the like, but is not limited thereto. The broadcast receiver 100 and the broadcast provider 300 may all communicate with the server 200 over a network 500 such as the Internet or the like.

As illustrated in FIG. 1, the broadcast receiver 100 and the broadcast provider 300 may communicate with the server 200 over the same network 500 or different networks.

The broadcast provider 300 may add metadata associated with an application into broadcast data. The metadata may be used for informing the broadcast receiver 100 that it is possible to launch an application. An operation of launching an application may include installing the application to be executed and executing the installed application.

Metadata may have various forms according to a broadcast standard applied to a broadcast system. For example, in digital video broadcasting (DVB), the metadata may be in the form of an application information table (AIT). The AIT may include a uniform resource locator (URL), connected to a web address for searching for application execution code, and an application identifier (ID). However, the broadcast system according to an exemplary embodiment is not limited to a case of using DVB.

When metadata is transmitted from the broadcast provider 300 to the broadcast receiver 100 using broadcast data, the metadata may be vulnerable to a man-in-the-middle (MITM) attack. The MITM attack may be an attack method that taps or manipulates communication details by using network communication, and an attacker may arbitrarily alter data between a transmitter and a receiver or may generate new data by using the MITM attack. Therefore, before launching an application on the basis of received broadcast data, the broadcast receiver 100 may check whether the received broadcast data is transmitted by the broadcast provider 300. By authenticating the metadata before launching the application, the broadcast receiver 100 may check whether the transmitted metadata is valid, and may safely launch an application corresponding to the metadata.

The broadcast receiver 100 may authenticate the metadata by using a metadata hash and a reference hash which are generated from the metadata. Here, the metadata hash may be a value which is obtained by applying a hash algorithm to the metadata. The metadata hash may be generated by the broadcast receiver 100 or the server 200.

The reference hash may be a value that is used for comparing with the metadata hash when authenticating the metadata. Here, the reference hash may be generated based on the metadata by the broadcast provider 300. Also, before the broadcast data is transmitted to the broadcast receiver 100, the broadcast provider 300 may previously transmit the reference hash to the broadcast receiver 100 or the server 200. The broadcast receiver 100 or the server 200 may store the transmitted reference hash and then may use the stored reference hash when authenticating the metadata.

Moreover, the reference hash may include a valid period. In this case, a reference hash may be used when authenticating the metadata during its valid period. Also, the reference hash may be updated periodically or according to a user request.

Figure 2:
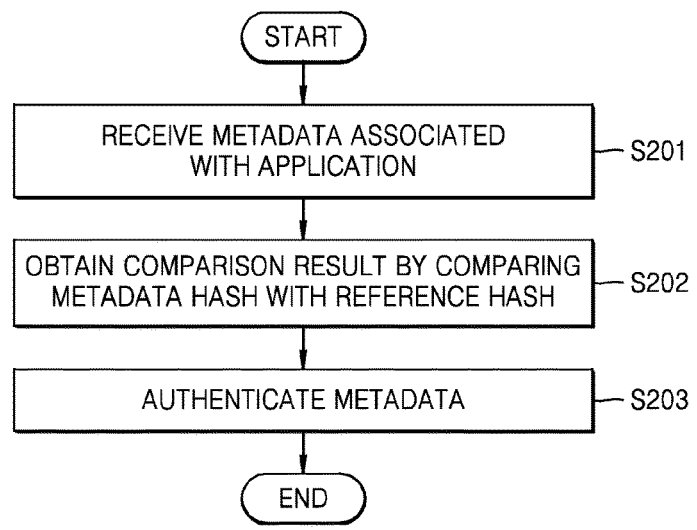
FIG. 2 is a flowchart illustrating an operation, performed by a broadcast receiver, of authenticating metadata, according to an exemplary embodiment.

FIG. 2 is a flowchart illustrating an operation, performed by a broadcast receiver, of authenticating metadata, according to an exemplary embodiment.

In operation S201, the broadcast receiver 100 may receive broadcast data including metadata associated with an application executable by the broadcast receiver 100. Here, the metadata may include service identification information for identifying a service corresponding to the application. Also, the metadata may include authorization server identification information for identifying one or more authorization servers that are authorized for the application to perform communication. For example, the authorization server identification information may include a list of authorized URLs, a list of authorized Internet protocol (IP) addresses, and/or the like, but is not limited thereto. When executing the application, the broadcast receiver 100 may prevent the application from communicating with a server which is not identified as an authorization server.

In operation S202, the broadcast receiver 100 may obtain a comparison result by comparing a metadata hash with a reference hash. The metadata hash and the reference hash may be generated by using the hash algorithm. An output generated by using the hash algorithm may be referred to as a hash value, a hash code, or a hash sum, but is not limited thereto.

The metadata hash may be directly generated by the broadcast receiver 100, or may be remotely generated by the server 200.

The reference hash may be generated based on the metadata by the broadcast provider 300. According to an exemplary embodiment, the reference hash may be stored in a local cache of the broadcast receiver 100, or may be stored in the server 200. When the reference hash is stored in the server 200, the broadcast receiver 100 may request the reference hash from the server 200, receive the reference hash from the server 200, and compare the received reference hash with the metadata hash.

In operation S203, the broadcast receiver 100 may authenticate the metadata, based on a result obtained by comparing the metadata hash with the reference hash. When the metadata hash matches the reference hash, the broadcast receiver 100 may check that the received metadata matches the metadata transmitted by the broadcast provider 300. When the metadata is successfully authenticated, the broadcast receiver 100 may automatically launch the application, or may obtain approval from the user and then launch the application.

When the metadata hash does not match the reference hash, the authentication of the metadata may fail. That the metadata hash does not match the reference hash may denote that the metadata received by the broadcast receiver 100 has been changed by an attacker.

The attacker may use a high power transmitter for changing a broadcast signal and metadata, transmitted by a broadcast provider, to its own data. For example, the attacker may change an application URL, directly connected to the broadcast receiver 100, to an application URL connected to another server storing a malicious execution code.

When the authentication of the metadata fails, the broadcast receiver 100 may display a warning message indicating that the metadata is not authenticated. While displaying the warning message, the broadcast receiver 100 may receive a user input for selecting whether to launch the application, despite the metadata being unauthenticated. Also, the broadcast receiver 100 may launch the application or may perform various operations such as launching the application and the like in a protected mode, based on a selection of the user. When the authentication of the metadata fails, the broadcast receiver 100 may perform one or more of the above-described operations, but is not limited thereto.

Hereinafter, a case where a plurality of reference hashes are stored in the broadcast receiver 100 will be described in detail.

According to an exemplary embodiment, a plurality of reference hashes may be stored in the local cache of the broadcast receiver 100. Generally, the metadata may be quasi-static, but the broadcast provider 300 may occasionally update the metadata. When the plurality of reference hashes are stored in the local cache of the broadcast receiver 100 (for example, an internal memory or a local network storage), the broadcast receiver 100 may store authentication information associated with the plurality of reference hashes for the same application along with the plurality of reference hashes. The authentication information may define valid periods of the plurality of reference hashes. The broadcast receiver 100 may select a reference hash, which is valid at a time when the metadata is received, from among the plurality of reference hashes stored in the local cache and may compare a metadata hash with the selected reference hash. Therefore, since the broadcast receiver 100 stores a plurality of reference hashes for the same application along with authentication information, received metadata is accurately authenticated, despite the metadata being updated by the broadcast provider 300.

When a reference hash obtained through an update does not match the metadata hash, the broadcast receiver 100 may determine that the received metadata is invalid.

Figure 3:
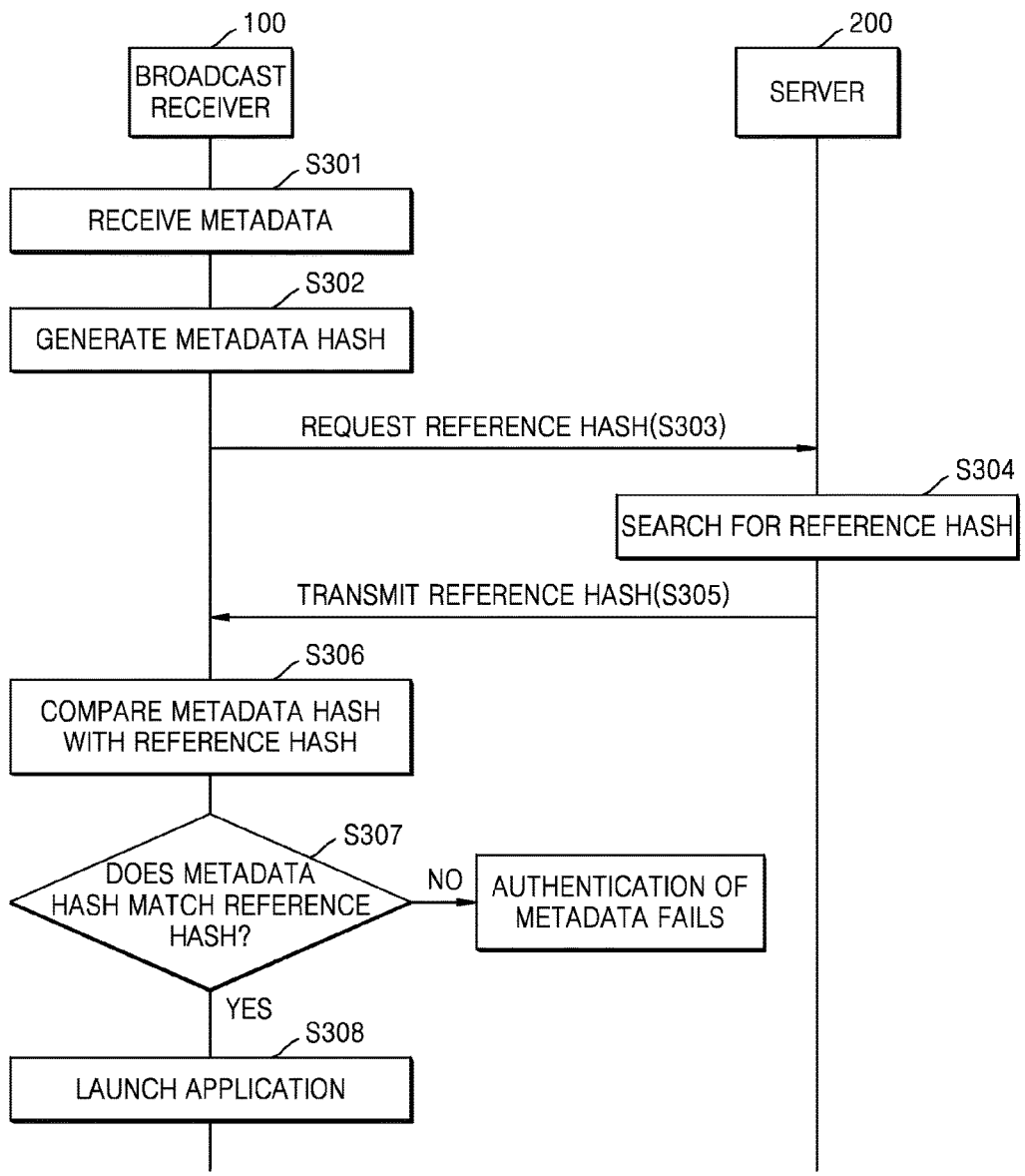
FIG. 3 is a flowchart illustrating a metadata authentication operation according to an exemplary embodiment.

FIG. 3 is a flowchart illustrating a metadata authentication operation according to an exemplary embodiment.

In operation S301, the broadcast receiver 100 may receive broadcast data including metadata associated with an application.

In operation S302, the broadcast receiver 100 may generate a metadata hash from the metadata. The metadata hash may be generated using a generally known hash algorithm.

In operation S303, the broadcast receiver 100 may transmit, to the server 200, a request for a reference hash for authenticating the metadata. An address of the server 200 for requesting the reference hash may have been previously programmed in the broadcast receiver 100.

The request for the reference hash may include service identification information for identifying a broadcast service provided by the application, in order for the server 200 to search for an accurate reference hash in a storage of the server 200. The broadcast receiver 100 may launch an application corresponding to a service, thereby using the service provided by a service provider 400. A service may correspond to an application in a one-to-one relationship. Here, service identification information may have various forms, and the form of the service identification information may be changed according to a broadcast standard used by the broadcast system. Also, the service identification information may include information of metadata. For example, the service identification information may include a country ID for identifying a country at which the broadcast receiver 100 is located, or a broadcast medium ID for identifying a broadcast medium such as a cable broadcast, an over-the-air broadcast, a satellite broadcast, and/or the like, but is not limited thereto.

Moreover, when broadcast standard used by the broadcast system is DVB, service identification information may include a DVB triplet. The DVB triplet may include an original network ID (ON-ID), a transport stream ID (TS-ID), and a service ID (S-ID). The server 200 may individually identify services provided by an application, based on the DVB triplet and may transmit one reference hash to the broadcast receiver 100.

Service identification information according to an exemplary embodiment may be used to separately identify a certain service, or may be used to identify a plurality of certain services. In detail, since one piece of service identification information may correspond to a plurality of certain services in one or more exemplary embodiments, the service identification information may be used to identify a service corresponding to each of users.

In operation S304, the server 200 may search for the reference hash in the storage of the server 200, based on the transmitted request. When one piece of service identification information corresponds to a plurality of services, the server 200 may search for reference hashes for the plurality of services corresponding to the received service identification information. In operation S305, the server 200 may transmit the reference hash to the broadcast receiver 100. When one piece of service identification information corresponds to a plurality of services, the server 200 may transmit a plurality of reference hashes for the plurality of services to the broadcast receiver 100.

In operation S306, the broadcast receiver 100 may compare the metadata hash with the received reference hash to determine whether the metadata hash matches the received reference hash. If a service corresponds to an application in a one-to-one relationship, and if the metadata received by the broadcast receiver 100 is valid, the metadata hash may match the reference hash received from the server 200. When the metadata hash matches the reference hash, the metadata may be successfully authenticated, and the broadcast receiver 100 may launch the application in operation S308.

However, when the metadata hash does not match the reference hash, the authentication of the metadata may fail. Therefore, the broadcast receiver 100 may display a warning message indicating that the metadata is not authenticated. Even when the authentication of the metadata fails, the broadcast receiver 100 may receive a user input for forcibly executing the application and may forcibly execute the application, based on the user input.

Figure 4:
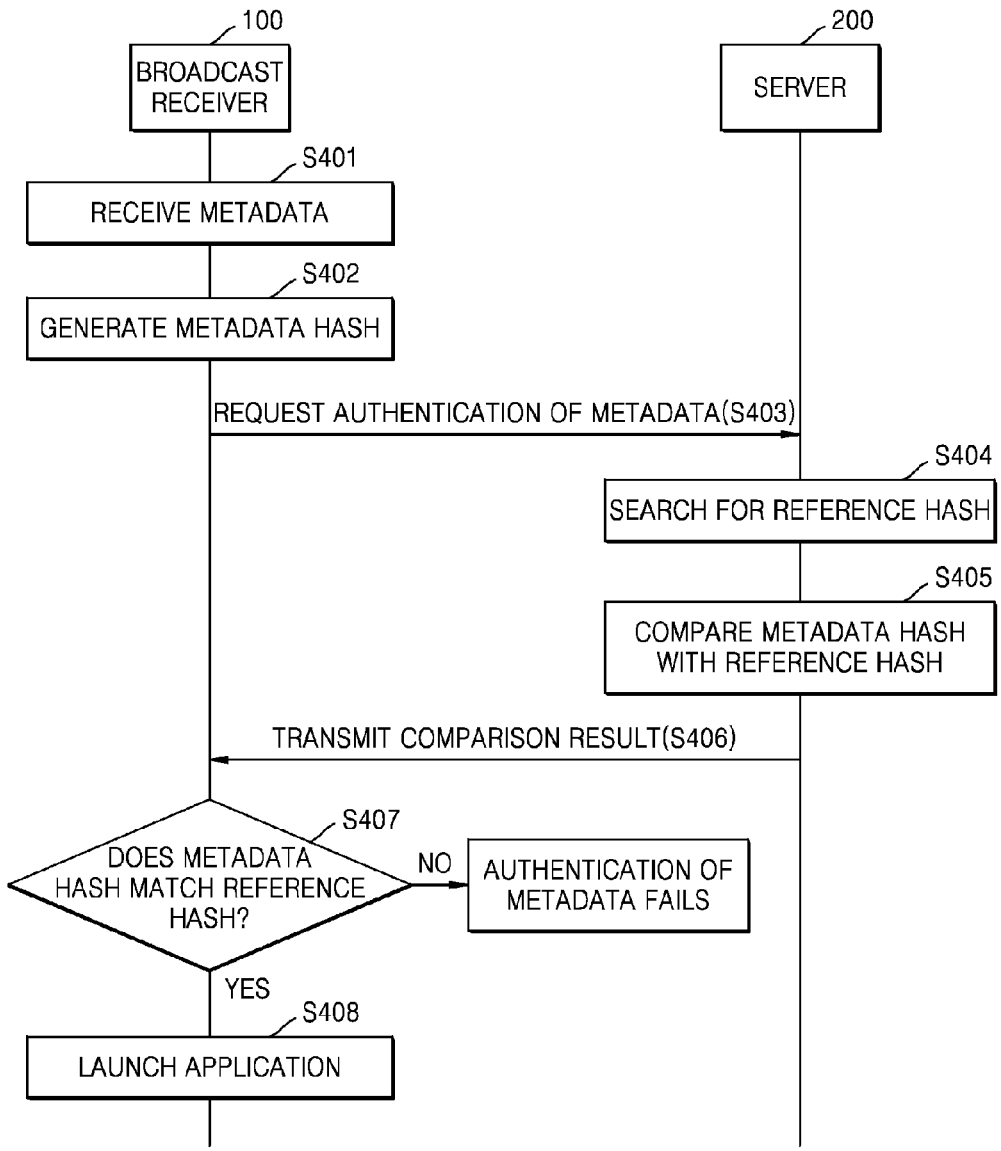
FIG. 4 is a flowchart illustrating a metadata authentication operation according to an exemplary embodiment.

FIG. 4 is a flowchart illustrating a metadata authentication operation according to an exemplary embodiment.

Referring to FIG. 4, the broadcast receiver 100 may receive metadata in operation S401, and may generate a metadata hash from the received metadata in operation S402.

In operation S403, the broadcast receiver 100 may transmit an authentication request for the metadata to the server 200. Here, the authentication request may include a metadata hash and service identification information.

In operation S404, the server 200 may receive an authentication request for the metadata and may extract the metadata hash from the received authentication request. Also, the server 200 may extract the service identification information from the received authentication request and may search for a reference hash for a service corresponding to the extracted service identification information.

In operation S405, the server 200 may compare the reference hash with the metadata hash to determine whether the reference hash matches the metadata hash.

The service identification information may allow a single service among a plurality of services to be individually identified. For example, the server 200 may search for reference hashes for a plurality of certain services in operation S404, and may compare a found plurality of reference hashes with the metadata hash to determine whether one of the found plurality of reference hashes matches the metadata hash in operation S405. The server 200 may compare a plurality of reference hashes with the metadata hash sequentially, and when one of the plurality of reference hashes matches the metadata hash, may terminate operation S405.

In operation S406, the server 200 may transmit a result of the comparison to the broadcast receiver 100. For example, when the metadata hash matches the reference hash, the server 200 may transmit, to the broadcast receiver 100, a message indicating that the metadata is valid. However, when the metadata hash does not match the reference hash, the server 200 may transmit, to the broadcast receiver 100, a message indicating that the metadata is invalid.

In operation S407, the broadcast receiver 100 may authenticate the metadata, based on the comparison result received from the server 200.

In operation S408, when the metadata is successfully authenticated, the broadcast receiver 100 may launch the application.

However, when the authentication of the metadata fails, the broadcast receiver 100 may display a warning message indicating that the authentication of the metadata failed.

In the authentication method illustrated in FIG. 4, a metadata hash may be transmitted as a portion of an authentication request for the metadata instead of metadata. Since a size of the metadata hash is smaller than that of the metadata itself, the broadcast receiver 100 may reduce the amount of data transmitted to the server 200.

Figure 5:
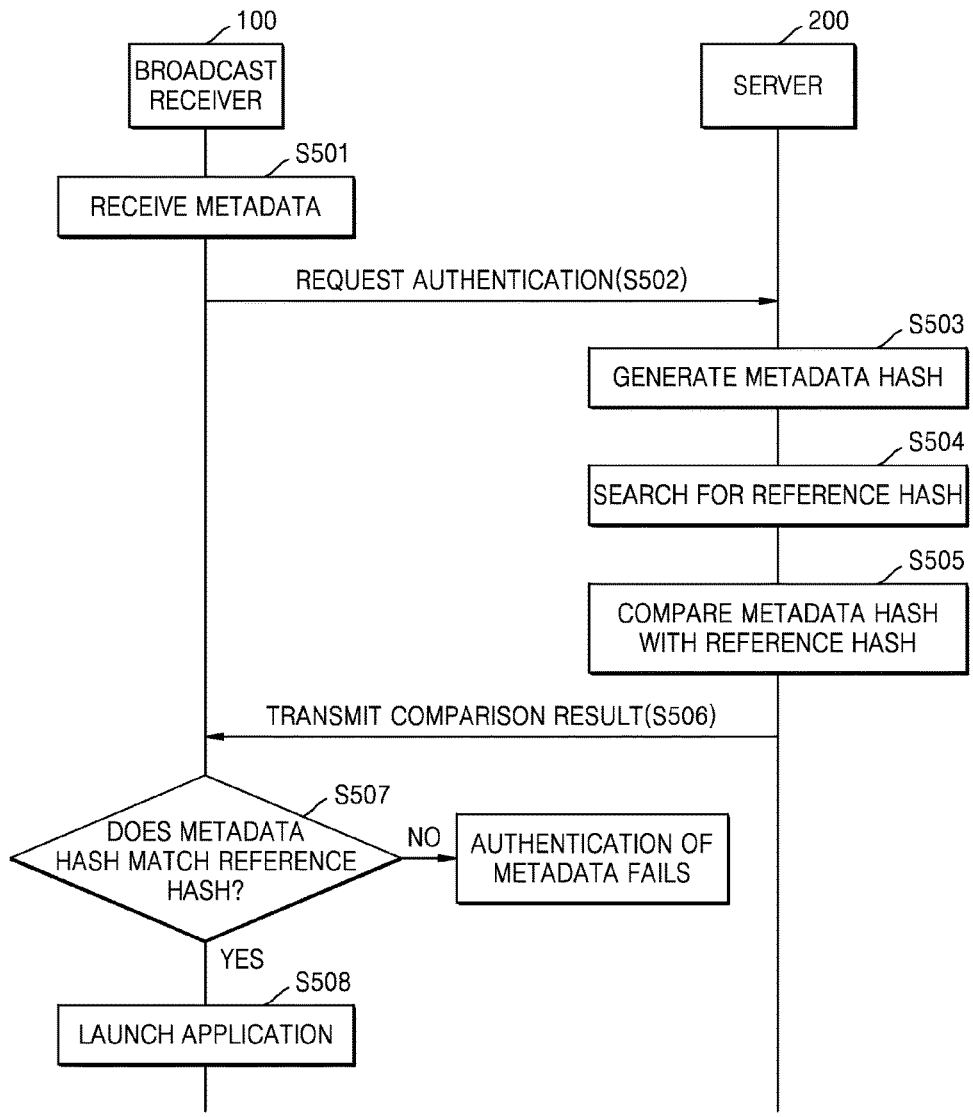
FIG. 5 is a flowchart illustrating a metadata authentication operation according to an exemplary embodiment.

FIG. 5 is a flowchart illustrating a metadata authentication operation according to an exemplary embodiment.

Operations S501 and S504 to S508 of FIG. 5 respectively correspond to operations S401 and S404 to S408 of FIG. 4.

Referring to FIG. 5, in operation S502, the broadcast receiver 100 may transmit an authentication request for metadata to the server 200. The authentication request may include the metadata and service identification information.

In operation S503, the server 100 may extract the metadata from the transmitted authentication request and may generate a metadata hash, based on the extracted metadata. The server 200 may use a hash algorithm for generating the metadata hash.

In operation S504, the server 200 may extract the service identification information, from the received authentication request and may search for a reference hash for a service corresponding to the extracted service identification information. Operations S503 and S504 may be performed in a reverse order or may be performed simultaneously.

The server 200 may compare the metadata, generated in operation S505, with the reference hash to determine whether the metadata matches the reference hash, and may transmit a result of the comparison to the broadcast receiver 100 in operation S506.

In the method illustrated in FIG. 4, the broadcast receiver 100 may generate the metadata hash and may transmit the generated metadata hash as a portion of the authentication request. However, in the method illustrated in FIG. 5 the broadcast receiver 100 may transmit the authentication request including all of the metadata to the server 200, and the server 200 may generate the metadata hash.

In the method illustrated in FIG. 5, since the server 200 generates the metadata hash and compares the metadata hash with the reference hash to determine whether the metadata hash matches the reference hash, a processing burden of the broadcast receiver 100 is minimized.

Figure 6:
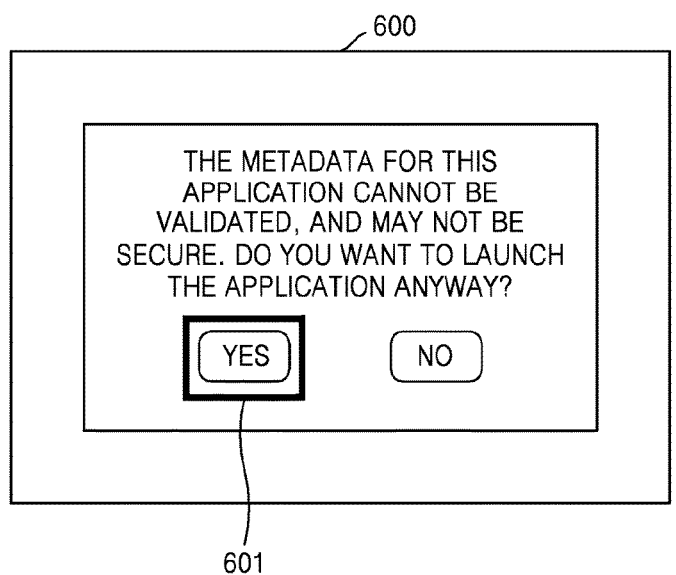
FIG. 6 is a diagram illustrating an example of a display that displays a warning message when authentication of metadata fails.

FIG. 6 is a diagram illustrating an example of a display that displays a warning message when authentication of metadata fails.

A display 600 of the broadcast receiver 100 according to an exemplary embodiment may display a warning message indicating that authentication of received metadata fails. While displaying the warning message, the broadcast receiver 100 may receive a user input for selecting whether to launch an application.

As illustrated in FIG. 6, when a user selects YES in operation S601, the broadcast receiver 100 may launch the application despite the authentication of the metadata failing. Alternatively, when NO is selected, the broadcast receiver 100 may not launch the application.

Moreover, when the authentication of the metadata fails, the broadcast receiver 100 according to an exemplary embodiment may launch the application in the protected mode. When desiring to launch the application in the protected mode, the broadcast receiver 100 may execute the application in a state of having a limited authority.

Figure 7:
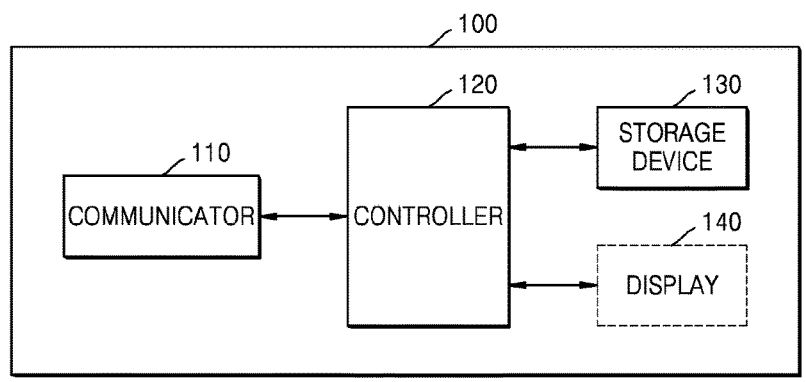
FIG. 7 is a block diagram illustrating a configuration of a broadcast receiver according to an exemplary embodiment.

FIG. 7 is a block diagram illustrating a configuration of a broadcast receiver 100 according to an exemplary embodiment.

Referring to FIG. 7, the broadcast receiver 100 according to an exemplary embodiment may include a communicator 110, a controller 120, and a storage 130, e.g., a storage device. According to one or more exemplary embodiments, the broadcast receiver 100 may be implemented with additional elements, for example, a display 140.

The communicator 110 may receive metadata associated with an application from the broadcast provider 300. The communicator 110 may be a transceiver.

The communicator 110 may transmit, to the server 200, a request for a reference hash or an authentication request for the metadata. When the communicator 110 transmits the authentication request for the metadata to the server 200, the authentication request may include service identification information. In other exemplary embodiments, the authentication request may include the metadata or a metadata hash.

When the communicator 110 transmits the request for the reference hash to the server 200, the communicator 110 may receive the reference hash found in the server 200. Alternatively, when the communicator 110 transmits the authentication request for the metadata to the server 200, the communicator 110 may receive a result which is obtained by the server 200 comparing the metadata hash with the reference hash.

The controller 20 may obtain a comparison result of the metadata hash and the reference hash and may authenticate the metadata, based on the obtained comparison result. An operation of comparing the metadata hash with the reference hash may be performed by the controller 120 of the broadcast receiver 100 or may be remotely performed by the server 200. When the metadata hash matches the reference hash, the controller 120 may determine that the metadata, received through the communicator 110, is valid and may launch the application. However, when the metadata hash does not match the reference hash, the controller 120 may determine the received metadata as invalid.

Further, when a plurality of reference hashes are stored in the broadcast receiver 100, the controller 120 may compare the plurality of reference hashes with the metadata hash to determine whether one of the plurality of reference hashes matches the metadata hash.

The controller 120 may select a reference hash, which is valid at a time when the metadata is received, from among the plurality of reference hashes, based on authentication information indicating a valid period of a corresponding reference hash.

The controller 120 may obtain, from the metadata, authentication server identification information for identifying one or more authorized servers which are authorized for the application to perform communication. The controller 120 prevents the application from communicating with an unauthorized server when executing the application, based on the obtained authentication server identification information.

When the authentication of the metadata fails, the controller 120 may perform control a display of a warning message indicating that the metadata is not authenticated. Also, the controller 120 may perform control to forcibly execute the application according to a selection of a user even when the authentication of the metadata fails.

The storage 130 may store a plurality of reference hashes for a same service. Therefore, even when the server 200 cannot be used to authenticate the metadata, the broadcast receiver 100 may authenticate the metadata.

Moreover, the storage 130 may store authentication information indicating valid periods of a plurality of reference hashes.

The display 140 may display information of an application launched by the broadcast receiver 100. When metadata is authenticated, the broadcast receiver 100 may launch the application, based on a result of the authentication. In this case, the display 140 may display the information of the application which includes a name of the launched application, an application description, an icon representing the application, and/or the like, but is not limited thereto. As non-limiting examples, the display 140 may display the information of the application in the form of popups and may display the information as highlights on a lower end of the display 140.

Moreover, when the authentication of the metadata fails, the display 140 may display a warning message indicating that the metadata is not authenticated. As non-limiting examples, the warning message may be displayed in the form of popups and may be displayed as highlights on the lower end of the display 140.

The display 140 may display a message for selecting whether to launch the application, along with the warning message.

Figure 8:
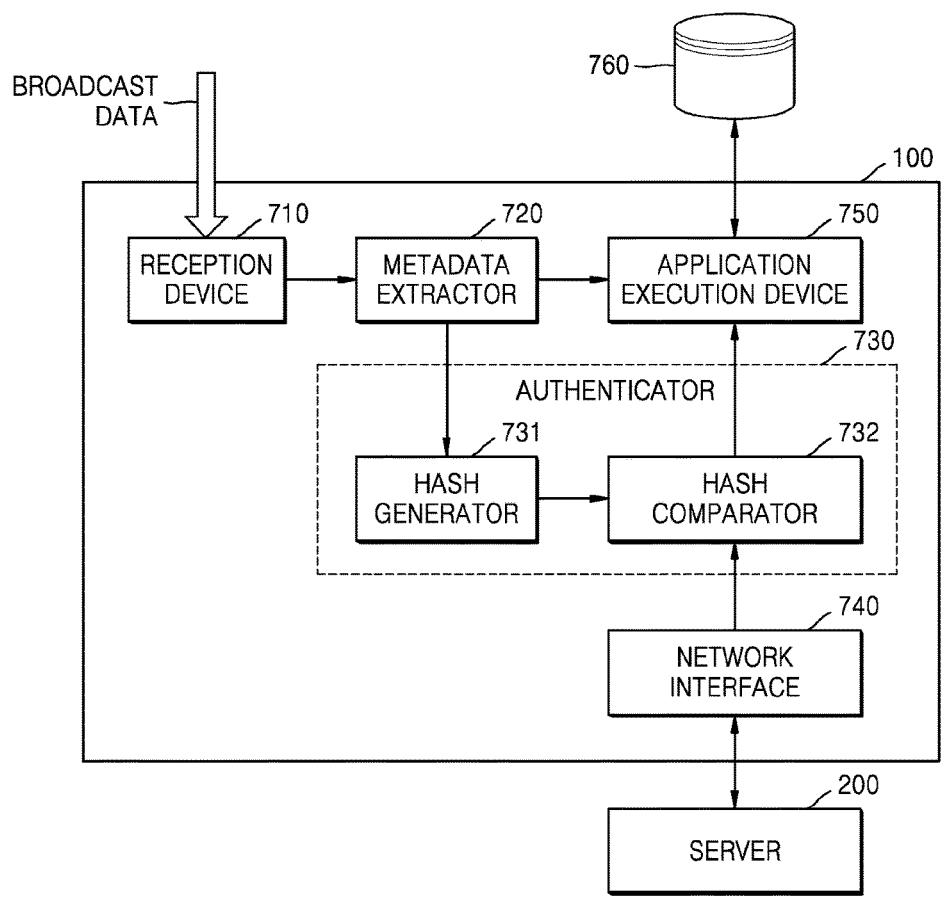
FIG. 8 is a block diagram illustrating a configuration of a broadcast receiver according to an exemplary embodiment.

FIG. 8 is a block diagram illustrating a configuration of a broadcast receiver 100 according to an exemplary embodiment.

As illustrated in FIG. 8, the broadcast receiver 100 according to an exemplary embodiment may include a reception device 710, a metadata extractor 720, an authenticator 730, a network interface 740, and an application execution device 750. In FIG. 8, the reception device 710 and the network interface 740 may be included in the communicator 110 of FIG. 7, and the metadata extractor 720, the authenticator 730, and the application execution device 750 may be included in the controller 120 of FIG. 7.

The broadcast receiver 100 disclosed in FIG. 8 may perform the authentication method illustrated in FIG. 3. In one or more exemplary embodiments, one or more elements illustrated in FIG. 8 may be omitted.

The reception device 710 may receive broadcast data including metadata associated with an application executable by the broadcast receiver 100.

The metadata extractor 720 may extract metadata from the received broadcast data.

The authenticator 730 may authenticate the metadata, based on a result obtained by comparing a reference hash with a metadata hash.

Referring to FIG. 8, the authenticator 730 may include a hash generator 731 and a hash comparator 732. The hash generator 731 may generate the metadata hash, based on the metadata extracted by the metadata extractor 720. The hash comparator 732 may compare the metadata hash with the reference hash and may authenticate the metadata, based on a result of the comparison. Also, the hash comparator 721 may transmit a request for the reference hash from the server 200 through the network interface 740 and may receive the requested reference hash though the network interface 740.

Moreover, the broadcast receiver 100 may include an application execution device 750 that executes an application corresponding to the extracted metadata. Here, the application execution device 750 may include one or more processors that execute a program instruction included in an application execution code. When the metadata is successfully authenticated, the application execution device 750 may execute the application corresponding to the metadata.

Moreover, the application execution device 750 may search for the application execution code in an external storage 760, e.g., an external storage device, such as an application server, based on a URL included in the metadata. However, the above-disclosed exemplary embodiments are not limited to a case where the application execution code is stored in the external storage 760. In other exemplary embodiments, the application execution code may be stored in the broadcast receiver 100.

Figure 9:
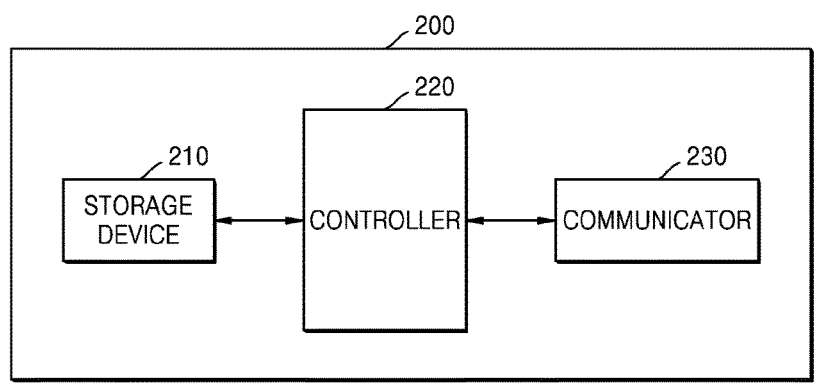
FIG. 9 is a block diagram illustrating a configuration of a server according to an exemplary embodiment.

FIG. 9 is a block diagram illustrating a configuration of a server 200 according to an exemplary embodiment.

The server 200 may authenticate metadata received from the broadcast receiver 100 according to the method illustrated in FIG. 5.

Referring to FIG. 9, the server 200 according to an exemplary embodiment may include a storage 210, a controller 220, and a communicator 230.

The storage 210 may store a reference hash necessary to authenticate metadata.

The communicator 230 may receive an authentication request for the metadata from the broadcast receiver 100.

The controller 220 may generate a metadata hash, based on the authentication request including the metadata. However, in other exemplary embodiments, the broadcast receiver 100 may generate the metadata hash, and the authentication request transmitted from the broadcast receiver 100 to the server 200 may include the metadata hash. In this case, the controller 220 may not perform an operation of generating the metadata hash.

The controller 220 may identify a service associated with the metadata from service identification information included in the authentication request and may search for a reference hash corresponding to the identified service.

The controller 220 may compare the metadata hash with the reference hash to determine whether the metadata hash matches the reference hash, and may control the communicator 230 to transmit a result of the comparison to the broadcast receiver 100.

Figure 10:
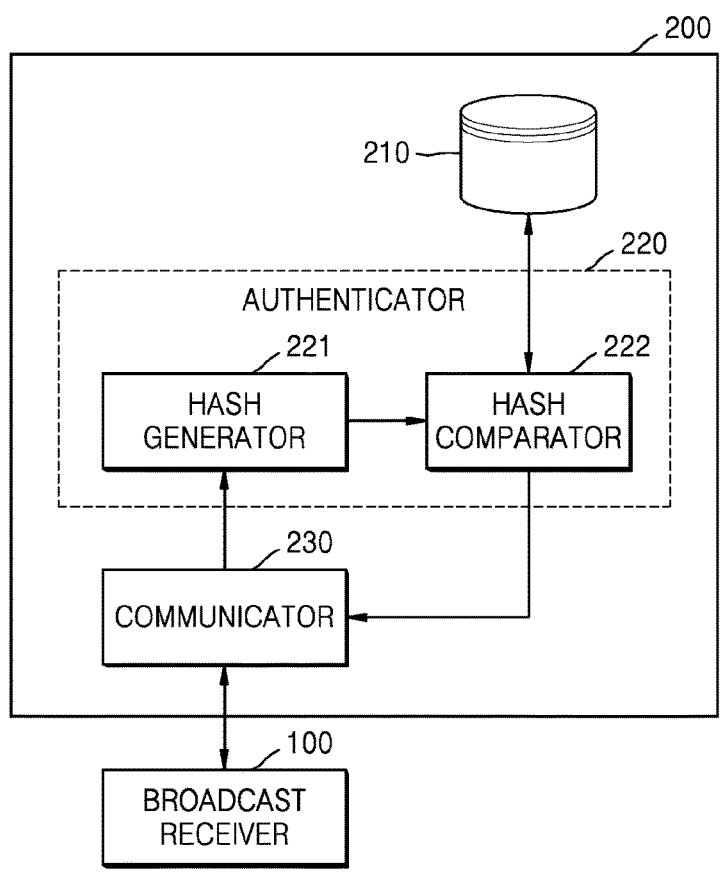
FIG. 10 is a block diagram illustrating a configuration of a server according to an exemplary embodiment.

FIG. 10 is a block diagram illustrating a configuration of a server 200 according to an exemplary embodiment.

Referring to FIG. 10, the server 200 may include an authenticator 220 including a hash generator 221 and a hash comparator 222, a communicator 230, and a storage 210.

According to one or more exemplary embodiments, one or more elements of the server 200 illustrated in FIG. 10 may be omitted. The authenticator 220 of FIG. 10 may be included in the controller 220 of FIG. 9. The communicator 230 and storage 210 of FIG. 10 respectively correspond to the communicator 230 and storage 210 of FIG. 9.

The authenticator 220 may include the hash generator 221 and the hash comparator 222.

The hash generator 221 may generate a metadata hash, based on metadata received from the communicator 230. However, in other exemplary embodiments, if the broadcast receiver 100 generates the metadata hash, the hash generator 221 may be omitted.

The hash comparator 222 may search for a reference hash corresponding to an identified service among a plurality of reference hashes stored in the storage 210 and may compare a found reference hash with the metadata hash generated by the hash generator 221.

When the metadata hash matches the reference hash, the server 200 may transmit, to the broadcast receiver 100, a message indicating that the metadata is valid.

Figure 11:
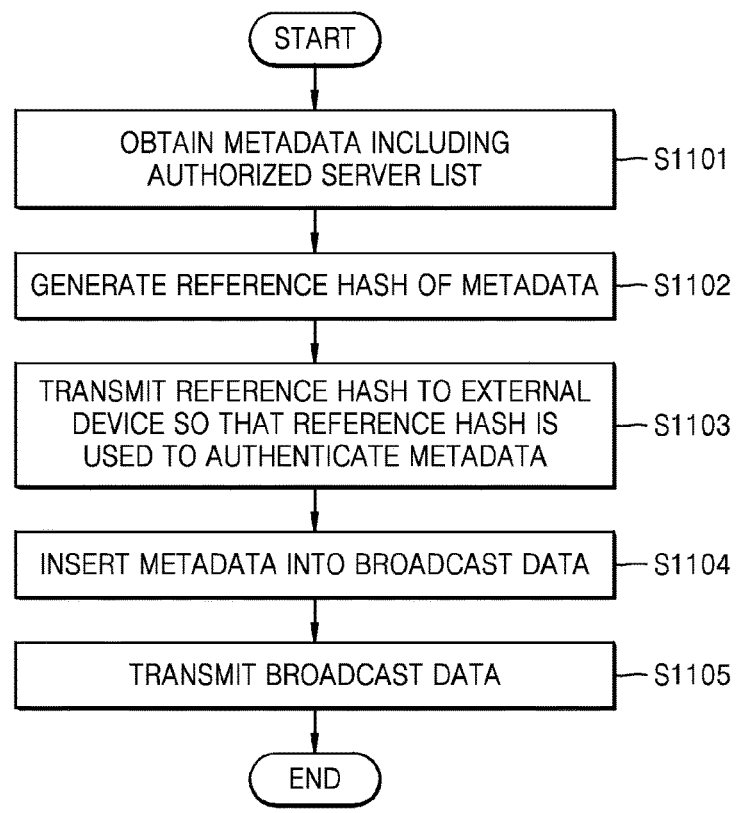
FIG. 11 is a flowchart illustrating an operation of a broadcast provider according to an exemplary embodiment.

FIG. 11 is a flowchart illustrating an operation of a broadcast provider according to an exemplary embodiment.

A method according to an exemplary embodiment may be performed by the broadcast provider 300 illustrated in FIG. 1.

In operation S1101, the broadcast provider 300 may obtain metadata associated with an application executable by the broadcast receiver 100. The broadcast provider 300 may receive the metadata from the service provider 400 that provides a broadcast service and an application associated with the broadcast service. Alternatively, the broadcast provider 300 may directly generate the metadata based on application information received from the service provider 400.

The metadata may include an authorization server list listing names and the like of authorized servers which are authorized for an application to perform communication. By using the authorization server list, the application is prevented from communicating with an unauthorized server.

In operation S1102, the broadcast provider 300 may generate a reference hash of the metadata by using a hash algorithm. The hash algorithm used to generate the reference hash may be the same as the hash algorithm which is used by the broadcast receiver 100 or the server 200 to generate a metadata hash.

In operation S1103, the broadcast provider 300 may transmit the generated reference hash to an external device so that the reference hash is used when authenticating the metadata. The external device may be the broadcast receiver 100 or the server 200. The reference hash may be stored in the external device, and, when metadata authentication is necessary, the reference hash may be used for the broadcast receiver 100 or the server 200 to compare the reference hash with the metadata hash to determine whether the reference hash matches the metadata hash.

In operation S1104, the broadcast provider 300 may insert the metadata into broadcast data, and in operation S1105, the broadcast provider 300 may transmit the broadcast data including the metadata to the broadcast receiver 100. Then, the broadcast receiver 100 may extract the metadata from the received broadcast data and may authenticate the extracted metadata by using the reference hash stored in the external device. The reference hash may be stored prior to the transmission of the broadcast data.

Figure 12:
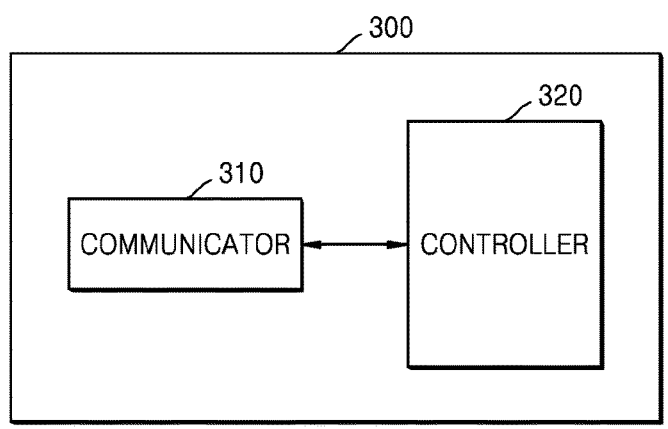
FIG. 12 is a block diagram illustrating a configuration of a broadcast provider according to an exemplary embodiment.

FIG. 12 is a block diagram illustrating a configuration of a broadcast provider according to an exemplary embodiment.

Referring to FIG. 12, the broadcast provider may include a communicator 310 and a controller 320.

The controller 320 may obtain metadata associated with an application. Here, the controller 320 may receive the metadata from the service provider 400 that provides a broadcast service and an application associated with the broadcast service. Alternatively, the controller 320 may generate the metadata, based on application information received from the service provider 400.

The controller 320 may generate a reference hash from the obtained metadata and may insert the metadata into broadcast data.

The communicator 310 may transmit the broadcast data including the metadata to the broadcast receiver 100.

Moreover, the communicator 310 may transmit the reference hash, generated by the controller 310, to an external device so that the reference hash may be used when authenticating the metadata. As described above, the external device may be the broadcast receiver 100 or the server 200.

Figure 13:
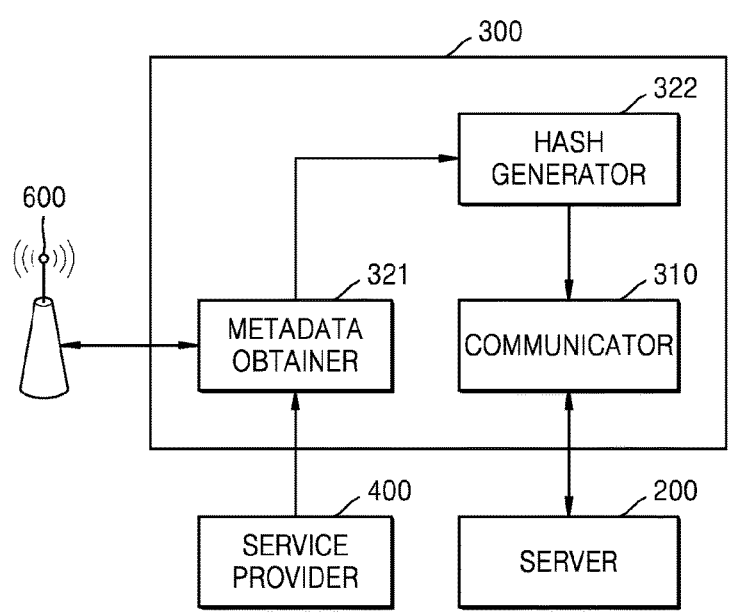
FIG. 13 is a block diagram illustrating a configuration of a broadcast provider according to an exemplary embodiment.

FIG. 13 is a block diagram illustrating a configuration of a broadcast provider according to an exemplary embodiment.

Referring to FIG. 13, the broadcast provider 300 may include a metadata obtainer 321, a hash generator 322, and a communicator 310. The metadata obtainer 321 and the hash generator 322 may be included in the controller 320 of FIG. 12. The communicator 310 illustrated in FIG. 13 may correspond to the communicator 310 illustrated in FIG. 12.

The metadata obtainer 321 may generate metadata, based on application information received from the service provider 400. Alternatively, the metadata obtainer 321 may receive the metadata from the service provider 400.

The hash generator 322 may generate a reference hash of the metadata, based on the metadata generated by the metadata obtainer 321. As described above, a hash algorithm used to generate the reference hash may be the same as the hash algorithm which is used by the broadcast receiver 100 or the server 200 to generate a metadata hash.

All operations of the method according to the exemplary embodiments may be performed by dedicated hardware, such as an application specific integrated circuit (ASIC), or software having the form of computer program instructions.

Moreover, various elements of the apparatus according to the exemplary embodiments may be implemented in hardware or software, or may be implemented by a combination of hardware and software. For example, one or more elements may be implemented as one or more processors configured to execute computer readable code stored on one or more memories.

Computer program instructions may be stored in a computer-readable storage medium, and may be executed by an appropriate processing unit including one more processors.

It should be understood that exemplary embodiments described herein should be considered in a descriptive sense only and not for purposes of limitation. Descriptions of features or aspects within each described exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A broadcast receiver comprising:
a communicator; and
at least one processor configured to:
control the communicator to receive, from a broadcast transmitter, broadcast data comprising metadata associated with an application, the received metadata comprising authorized server identification information for identifying at least one authorized server authorized to communicate information regarding the application,
generate a metadata hash by applying a hash algorithm to the received metadata,
control the communicator to transmit, to a server, an authentication request comprising the generated metadata hash and not including the metadata,
control the communicator to receive, from the server, a comparison result of comparing a reference hash, the reference hash being stored at the server, with the generated metadata hash,
authenticate the received metadata based on the comparison result, and
launch the application based on a result of the authentication,
wherein the reference hash is generated by the broadcast transmitter by applying the hash algorithm to the metadata associated with the application, the reference hash generated by the broadcast transmitter is transmitted to the server, and the reference hash transmitted to the server is stored at the server.

2. The broadcast receiver of claim 1, further comprising:
a display,
wherein the at least one processor is further configured to control the display to display information corresponding to the launched application.

3. The broadcast receiver of claim 1, wherein the at least one processor is further configured to compare the generated metadata hash with the reference hash.

4. The broadcast receiver of claim 3, further comprising:
a storage configured to store a plurality of reference hashes for a same application,
wherein the at least one processor is further configured to select a reference hash from among the stored plurality of reference hashes and compare the selected reference hash with the metadata hash.

5. The broadcast receiver of claim 3, further comprising:
a storage configured to store a plurality of reference hashes for a same application and authentication information indicating valid periods for the plurality of reference hashes, wherein
the at least one processor is further configured to select a reference hash from among the stored plurality of reference hashes having a valid period at a time when the metadata is received, based on the authentication information.

6. The broadcast receiver of claim 3,
wherein the at least one processor is further configured to:
control the communicator to transmit a request for the reference hash to the server and receive the reference hash from the server, the request for the reference hash comprising service identification information for identifying a service corresponding to the application, and
obtain the comparison result by comparing the received reference hash to the metadata hash.

7. The broadcast receiver of claim 6, wherein
the at least one processor is further configured to:
control the communicator to receive a plurality of reference hashes from the server in response to the request, and
authenticate the metadata by comparing the received plurality of reference hashes with the metadata hash to determine whether a reference hash of the received plurality of reference hashes matches the metadata hash.

8. The broadcast receiver of claim 1, wherein the authentication request comprises the metadata and service identification information for identifying a service corresponding to the application.

9. The broadcast receiver of claim 6, wherein the service identification information comprises at least one of an original network identifier (ON-ID), a transport stream identifier (TS-ID), a service identifier (S-ID), a country identifier (ID) for identifying a country at which the broadcast receiver is located, and a broadcast medium ID for identifying a broadcast medium through which the broadcast data received by the broadcast receiver passes.

10. The broadcast receiver of claim 1, further comprising:
a display,
wherein the at least one processor is further configured to, in response to the authentication of the metadata failing, control the display to display a warning message indicating that the metadata is not authenticated.

11. The broadcast receiver of claim 1, further comprising:
a user input device configured to receive a user input for forcibly executing the application when the authentication of the metadata fails,
wherein the at least one processor is further configured to forcibly execute the application, based on the user input.

12. A server for authenticating metadata associated with an application, the metadata comprising authorized server identification information for identifying at least one authorized server authorized for a broadcast receiver to communicate information regarding the application, the server comprising:
a storage configured to store a reference hash, wherein the reference hash is generated by a broadcast transmitter by applying a hash algorithm to the metadata and transmitted to the server;

a communicator configured to receive an authentication request from the broadcast receiver; and at least one processor configured to obtain a metadata hash of the metadata based on the authentication request by applying the hash algorithm to the metadata, search for a reference hash corresponding to the authentication request in the storage, compare the obtained metadata hash with the reference hash, and control the communicator to transmit a result of the comparison to the broadcast receiver to enable the broadcast receiver to authenticate the metadata based on the result of the comparison.

13. The server of claim 12, wherein the authentication request comprises service identification information for identifying a service corresponding to the metadata, and the at least one processor is further configured to search for the reference hash corresponding to the identified service in the storage.

14. The server of claim 12, wherein the authentication request comprises the metadata hash, and the at least one processor is further configured to extract the metadata hash from the authentication request.

15. The server of claim 13, wherein the at least one processor is further configured to search for a plurality of reference hashes in the storage, compare the metadata hash with the plurality of reference hashes to determine whether the metadata hash matches a reference hash of the plurality of reference hashes, and control the communicator to transmit a result of the comparison to the broadcast receiver.

16. A broadcast transmitter comprising:

at least one processor configured to obtain metadata associated with an application, the metadata comprising authorized server identification information for identifying at least one authorized server authorized for a broadcast receiver to communicate information regarding the application, generate a reference hash of the metadata by applying a hash algorithm to the metadata, and insert the metadata into broadcast data; and a communicator configured to transmit the broadcast data including the metadata to the broadcast receiver, wherein the at least one processor is further configured to control the communicator to transmit the reference hash to an external device so that the reference hash is used to authenticate the metadata.

17. A metadata authentication method comprising:

receiving, from a broadcast transmitter, broadcast data including metadata associated with an application, the received metadata comprising authorized server identification information for identifying at least one authorized server authorized to communicate information regarding the application;

generating a metadata hash by applying a hash algorithm to the received metadata, transmitting, to a server, an authentication request comprising the generated metadata hash and not including the metadata;

receiving a comparison result of comparing a reference hash, the reference hash being stored at the server, with the generated metadata hash, wherein the reference hash is generated by the broadcast transmitter by applying the hash algorithm to the metadata associated with the application, the reference hash generated by the broadcast transmitter is transmitted to the server, and the reference hash transmitted to the server is stored at the server; and in response to the comparison result indicating that the reference hash matches the metadata hash, authenticating the metadata and automatically launching the application.

* * * * *